J. G. Moxey,
Aerating Bread.
N° 51,659. Patented Dec. 19, 1865.
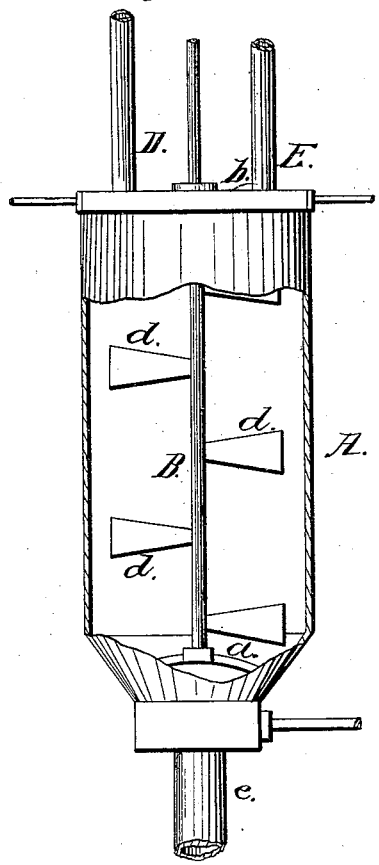
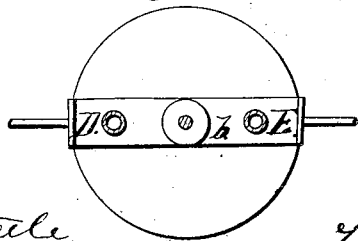
Witnesses
Wm Albert Steele
John Parker
Inventor:
J. G. Moxey
by his Atty
H. Howson

UNITED STATES PATENT OFFICE.

J. G. MOXEY, OF PHILADELPHIA, PENNSYLVANIA, ASSIGNOR TO HIMSELF, HENRY C. CARY, AND ABRAHAM HART, OF THE SAME PLACE.

IMPROVEMENT IN THE MANUFACTURE OF BREAD.

Specification forming part of Letters Patent No. 51,659, dated December 19, 1865.

*To all whom it may concern:*

Be it known that I, JOHN G. MOXEY, of Philadelphia, Pennsylvania, have invented an Improvement in the Manufacture of Bread; and I do hereby declare the following to be a full, clear, and exact description of the same, reference being had to the accompanying drawing, and to the letters of reference marked thereon.

My invention consists in injecting into a closed vessel containing flour an aqueous ferment charged with carbonic-acid gas.

The object of my invention is to manufacture bread which, although essentially unfermented, shall have a greater degree of porosity and lightness than the usual aerated bread, and be free from the unpalatable flavor of the latter.

In order to enable others skilled in the art to practice my invention, I will now proceed to describe a manner of carrying it into effect.

The view in the accompanying drawing represents apparatus which may be used to carry out my invention. It should be understood, however, that the mechanism illustrated is only an example, as apparatus differing in many respects from that illustrated may be used with good effect.

A is a closed cylindrical vessel having a tapering lower end and containing a central vertical shaft, B, which turns below in a suitable step, *a*, and above in a stuffing-box, *b*.

The shaft is provided with any desired number of canes, *d*, and is drawn by a belt or any suitable system of gearing.

D and E are pipes secured to the top of the vessel and communicating with the interior of the same, each pipe being furnished with a suitable valve. At the lower end of the vessel is the exit-pipe *e*, which must also be provided with an appropriate valve, *f*.

I prepare an aqueous ferment of malt, hops, flour, water, and potatoes, or such substances as bakers usually employ for the purpose. I charge this aqueous ferment with carbonic-acid gas by any of the processes usually employed in the preparations of aerated waters. Having introduced the desired quantity of flour into the vessel A and closed the valves of the pipes D and E, I inject the gas-charged ferment, containing an appropriate amount of salt, into the vessel through the pipe E while the contents of the vessel are being thoroughly intermixed by the revolving shaft and blades, and, after a thorough admixture has been thus effected, the contents may be discharged through the pipe *e*, the simple pressure of the gas being used for the purpose, and the discharged dough being ready for the baker.

Although I have illustrated and described certain apparatus for carrying out my invention it should be understood that any of the appliances heretofore used for the manufacture of aerated bread may be employed.

I claim as my invention, and desire to secure by Letters Patent—

Injecting into a closed vessel containing flour an aquous ferment charged with carbonic-acid gas, for the purpose specified.

In testimony whereof I have signed my name to this specification in the presence of two subscribing witnesses.

J. G. MOXEY.

Witnesses:
CHARLES E. FOSTER,
JOHN WHITE.